United States Patent
Kobayashi et al.

(10) Patent No.: US 11,034,602 B2
(45) Date of Patent: Jun. 15, 2021

(54) BIOLOGICAL ACTIVATED CARBON TREATMENT APPARATUS

(71) Applicant: KURITA WATER INDUSTRIES LTD., Tokyo (JP)

(72) Inventors: Hideki Kobayashi, Tokyo (JP); Tetsurou Fukase, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 0 days.

(21) Appl. No.: 16/464,541

(22) PCT Filed: Sep. 13, 2017

(86) PCT No.: PCT/JP2017/033058
§ 371 (c)(1),
(2) Date: May 28, 2019

(87) PCT Pub. No.: WO2018/100841
PCT Pub. Date: Jun. 7, 2018

(65) Prior Publication Data
US 2020/0180984 A1 Jun. 11, 2020

(30) Foreign Application Priority Data
Dec. 1, 2016 (JP) .............................. JP2016-234233

(51) Int. Cl.
*C02F 3/26* (2006.01)
*C02F 3/10* (2006.01)
(Continued)

(52) U.S. Cl.
CPC ................ *C02F 3/26* (2013.01); *C02F 3/085* (2013.01); *C02F 3/106* (2013.01); *C02F 3/208* (2013.01)

(58) Field of Classification Search
CPC .. C02F 3/26; C02F 3/085; C02F 3/106; C02F 3/201; C02F 3/208; C02F 3/104; C12M 25/20; C12M 29/04; Y02W 10/10
(Continued)

(56) References Cited

U.S. PATENT DOCUMENTS 4,883,594 A * 11/1989 Sekoulov .................. C02F 3/30
210/603
5,601,757 A 2/1997 Biselli et al.
(Continued)

FOREIGN PATENT DOCUMENTS

CN 102531153 A 7/2012
CN 104591374 A 5/2015
(Continued)

OTHER PUBLICATIONS

Europe Patent Office, "Search Report for European Patent Application No. 17876390.0," dated Jun. 10, 2020.
(Continued)

*Primary Examiner* — Nam X Nguyen
*Assistant Examiner* — Julia L. Wun
(74) *Attorney, Agent, or Firm* — Manabu Kanesaka

(57) ABSTRACT

Oxygen permeable membrane modules are provided in a reactor in multiple stages. An oxygen-containing gas from a blower B is sequentially circulated through the oxygen permeable membrane modules via pipes and is discharged from a pipe. Raw water flows out into a bottom part of the reactor through a plurality of nozzles, and a fluidized bed F of a biological carrier such as activated carbon is formed inside the reactor. Treated water flows out of a trough via an outflow port.

10 Claims, 8 Drawing Sheets

(51) Int. Cl.
*C02F 3/20* (2006.01)
*C02F 3/08* (2006.01)

(58) Field of Classification Search
USPC .......................................................... 210/620
See application file for complete search history.

(56) References Cited

U.S. PATENT DOCUMENTS

| | | |
|---|---|---|
| 6,531,058 B1 * | 3/2003 | Josse .................... C02F 3/2833 210/151 |
| 8,343,328 B2 | 1/2013 | Hook et al. |
| 2004/0211723 A1 | 10/2004 | Husain et al. |
| 2007/0131605 A1 | 6/2007 | Watari et al. |

FOREIGN PATENT DOCUMENTS

| | | |
|---|---|---|
| EP | 0470377 A2 | 2/1992 |
| EP | 1173271 A1 | 1/2002 |
| JP | S64-090093 A | 4/1989 |
| JP | H01-501437 A | 5/1989 |
| JP | H04-371298 A | 12/1992 |
| JP | H06-142695 A | 5/1994 |
| JP | H07-060272 A | 3/1995 |
| JP | H11-333481 A | 12/1999 |
| JP | H11-333487 A | 12/1999 |
| JP | 2003-211185 A | 7/2003 |
| JP | 2004-314062 A | 11/2004 |
| JP | 2005-034739 A | 2/2005 |
| JP | 2010-023002 A | 2/2010 |
| JP | 4907992 B2 | 4/2012 |
| TW | I306842 B | 3/2009 |
| TW | 200918454 A | 5/2009 |

OTHER PUBLICATIONS

PCT/ISA/210, "International Search Report for International Application No. PCT/JP2017/033058," dated Nov. 28, 2017.
Japanese Office Action of 2016-234233, dated Nov. 21, 2017.
Japanese Office Action of 2016-234233, dated Apr. 3, 2018.
Japanese Application Decision of Refusal 2016-234233, dated Aug. 28, 2018.
Japanese Application Submission of Publication of 2016-234233, dated Jul. 19, 2018.
Japanese Application Submission of Publication of 2016-234233, Reference 6: JSWA Publication: URL:https://www.swa.go.jp/g/g5/g5m/mb/pdf/166-2.pdf.
Europe Patent Office, "Communication pursuant to Article 94(3) EPC for European Patent Application No. 17876390.0," dated Apr. 8, 2021.
Cote, P. et al., "Bubble-free aeration using membranes: process analysis," Journal of the Water Pollution Control Federation (Journal WPCF), Nov. 1, 1988, p. 1986-1992, vol. 60, No. 11, Alexandria, VA, U.S., XP000025891.
Taiwan Patent Office, "Office Action for Taiwanese Patent Application No. 106132901," dated Oct. 27, 2020.

* cited by examiner

Fig. 1
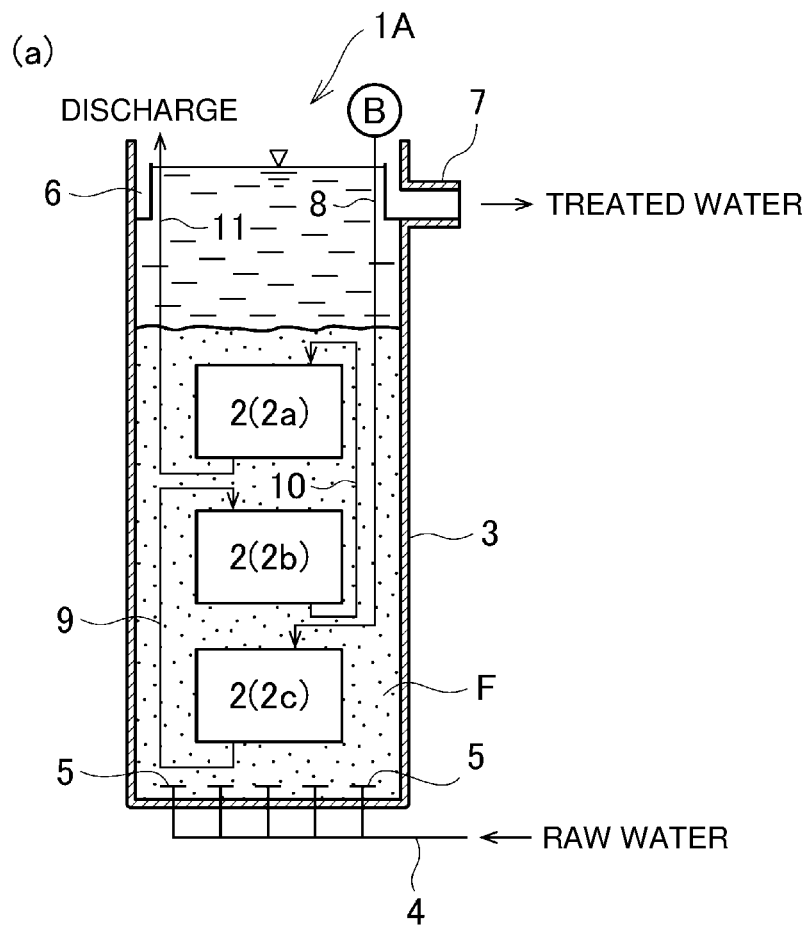
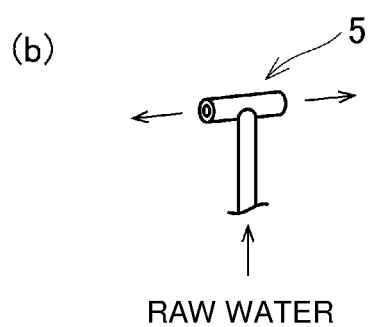

BIOLOGICAL ACTIVATED CARBON TREATMENT APPARATUS

TECHNICAL FIELD

The present invention relates to a biological activated carbon treatment apparatus for aerobic biological treatment of organic waste water.

BACKGROUND ART

Aerobic biological treatment methods are inexpensive and thus are often used as treatment methods for organic waste water. In such methods, it is necessary to dissolve oxygen in water to be treated, and aeration using a diffuser tube is generally performed.

In aeration using a diffuser tube, the dissolution efficiency is as low as about 5-20%. Further, since the aeration needs to be performed at a pressure equal to or higher than the water pressure applied at the water depth where the diffuser tube is provided, there has been a problem of the power cost of a blower for blowing a large amount of air at high pressure. Generally, ⅔ or more of the power cost in the aerobic biological treatment is used for dissolving oxygen.

Since deep aeration tanks can reduce the necessary area of apparatuses and have high oxygen dissolution efficiency, such tanks have been widely used in factories with small areas or as biological treatment apparatuses in urban areas. However, when aeration is preformed from the bottommost part of a deep aeration tank for biological treatment with a water depth of 5 m or more, for example, about 10 m, there are disadvantages of the need for a high-pressure blower and poor efficiency of the blower, resulting in high power cost. Further, there may be cases where the aeration is performed from the middle part of the aeration tank using a general-purpose medium-pressure blower, and the whole tank is stirred and mixed by a swirling flow. However, the oxygen dissolution efficiency is low in this method, as compared with the full aeration, resulting in a higher power cost.

A membrane aeration bioreactor (MABR) can dissolve oxygen without bubble formation. In the MABR, aeration may be performed with air at a pressure lower than the water pressure applied at the water depth. Therefore, the necessary pressure of the blower is low, and the oxygen dissolution efficiency is high.

In biological activated carbon treatment apparatuses for waste water from the production process of electronic parts, biological treatment has been performed by attaching oligotrophic bacteria to an activated carbon fluidized bed to grow there and supplying oxygen through pre-aeration. Further, in the field of water purification, advanced treatment, and the like, oxygen supply methods, using anthracite and fine sand particles in addition to activated carbon as carriers, by treating raw water subjected to pre-aeration in a fixed bed as a target and, in addition, directly aerating the activated carbon, anthracite, fine sand, and the like have been employed.

However, in pre-aeration, the concentration of dissolved oxygen is limited to 8 to 8.5 mg/L. Therefore, it is impossible to treat high-concentration raw water that needs oxygen exceeding this limit. There is also an attempt to supply a large amount of oxygen by returning treated water to dilute raw water, thereby increasing the circulating volume. However, a great effect cannot be obtained despite the need for a great pump power. Therefore, it is applicable only to a very thin waste liquid with a raw water TOC concentration of about 10 mg/L or less.

In a system of directly aerating a biological carrier, a large amount of oxygen can be supplied. However, there have been problems of unstable treatment and low treatment efficiency because attached organisms are detached due to intense disturbance by aeration, and sufficient biomass cannot be retained. Therefore, the treatment efficiency is far lower than in pre-aeration, and thus an apparatus with a size 10 times larger is needed.

JP S64-90093 A discloses that a porous hollow fiber membrane is used as an aeration device in a biological activated carbon apparatus and discloses that the aeration volume can be greatly reduced. However, even in this method, since oxygen is dissolved in a tank as fine bubbles, the blower pressure increases as the depth increases, while the dissolution efficiency greatly decreases.

JP H11-333481 A and JP H11-333487 A disclose a biological treatment apparatus using a gas permeable membrane as a carrier for organisms and an apparatus provided with an aerobic filtration bed in the subsequent stage. In the aerobic filtration bed, aeration is performed using an aeration blower, and the cost of aeration is great.

JP 4907992 B discloses that a non-porous gas separation membrane is used in an MABR that performs water treatment by forming a biofilm on the surface of a gas separation membrane. The gas separation membrane is used therein as a fixed carrier, and there is a problem of low treatment rate as compared with that in common biological activated carbon treatment, in the case of treatment of waste water with low concentration.

CITATION LIST

Patent Literature

PTL1: JP S64-90093 A
PTL2: JP H11-333481 A
PTL3: JP H11-333487 A
PTL4: JP 4907992 B

SUMMARY OF INVENTION

Technical Problem

It is an object of the present invention to provide a biological activated carbon treatment apparatus capable of treating organic waste water with high concentration at high load by supplying a large amount of oxygen without detaching organisms attached to activated carbon.

Solution to Problem

A fluidized bed of a biological carrier is formed inside the biological activated carbon treatment apparatus of the present invention, and the apparatus performs biological treatment on organic waste water. The apparatus comprises: a reactor; a raw water supply device that supplies raw water to a lower part of the reactor; an oxygen permeable membrane module provided inside the reactor; an oxygen-containing gas supply device that supplies an oxygen-containing gas to the oxygen permeable membrane module; and a treated water extraction device that extracts treated water from an upper part of the reactor, wherein the oxygen permeable membrane module comprises a non-porous oxygen permeable membrane.

In the present invention, it is preferable that the oxygen permeable membrane allow oxygen in the oxygen-containing gas supplied to permeate into the reactor and generate no air bubbles in the reactor.

In the biological activated carbon treatment apparatus according to one aspect of the present invention, the oxygen supply device comprises a blower, and the pressure of the blower is smaller than the water pressure generated at the water depth of the reactor.

In the biological activated carbon treatment apparatus according to one aspect of the present invention, the biological carrier is activated carbon.

Advantageous Effects of Invention

In the present invention, the amount of oxygen to be supplied is increased by providing a non-porous oxygen permeable membrane (oxygen dissolution film) in a fluidized bed of a biological carrier such as activated carbon, and therefore there is no upper limit in the concentration of organic waste water that is raw water as a target.

In the present invention, a biological carrier is operated in the fluidized bed and therefore is not exposed to intense disturbance. Accordingly, a large amount of organisms can be stably maintained, so that a high load can be set.

In the present invention, an oxygen dissolution film is used, and therefore oxygen dissolution power is low as compared to that in pre-aeration and direct aeration.

From these facts, the present invention enables high-load and inexpensive treatment of organic waste water with a concentration ranging from low concentration to high concentration.

BRIEF DESCRIPTION OF DRAWINGS

FIG. 1 includes configuration diagrams of a biological activated carbon treatment apparatus according to an embodiment.

DESCRIPTION OF EMBODIMENTS

Figure 2:
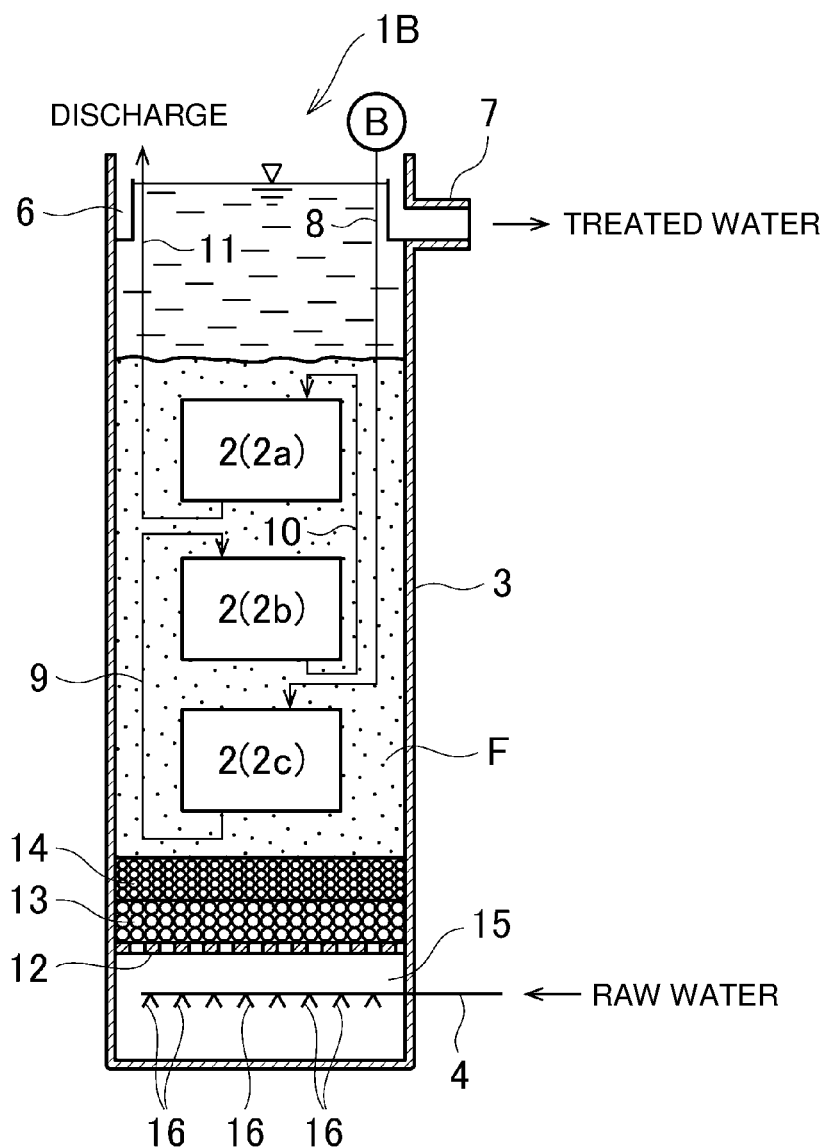
FIG. 2 is a vertical sectional view of a biological activated carbon treatment apparatus according to an embodiment.

Hereinafter, the present invention will be described further in detail with reference to the drawings.

The biological activated carbon treatment apparatus of the present invention is an aerobic biological treatment apparatus suitable for treating organic waste water from the production processes of sewage, paper pulp, chemicals, foods, automobiles, and the like, and includes oxygen permeable membrane modules disposed in a reactor. FIG. 1(*a*) is a vertical sectional view showing a biological activated carbon treatment apparatus 1A according to an example of the present invention, and FIG. 1(*b*) is a perspective view of a nozzle therein. The biological activated carbon treatment apparatus 1A includes a plurality of oxygen permeable membrane modules 2 disposed vertically in multiple stages within a reactor 3. In this embodiment, the oxygen permeable membrane modules 2 are provided in 3 stages, but the oxygen permeable membrane modules 2 are preferably provided in 2 to 8 stages, particularly 2 to 4 stages.

Raw water is supplied to the bottom part of the reactor 3 through a pipe 4 and a plurality of nozzles 5 to form a fluidized bed F of activated carbon. Treated water that has passed through the fluidized bed F flows over a trough 6 to flow out through an outflow port 7.

The oxygen permeable membrane modules 2 include non-porous oxygen permeable membranes, and oxygen permeated through the membranes is dissolved in water to be treated within the reactor 3. Therefore, no air bubbles are generated in the reactor 3.

In FIG. 1, an oxygen-containing gas such as air from a blower B is supplied to the top of an oxygen permeable membrane module 2*c* that is in the lowermost stage through a pipe 8, flows out of the bottom of the oxygen permeable membrane module 2*c*, is supplied to the top of an oxygen permeable membrane module 2*b* that is in the second stage from the uppermost stage via a pipe 9, flows out of the bottom of the oxygen permeable membrane module 2*b*, and is supplied to the top of an oxygen permeable membrane module 2*a* in the uppermost stage via a pipe 10. The gas that has flowed out of the bottom of the oxygen permeable membrane module 2*b* is discharged via a pipe 11.

The oxygen permeable membrane modules 2 are preferably present throughout substantially the entire region of the fluidized bed F of activated carbon in the vertical direction. Further, the oxygen permeable membrane modules 2 are preferably disposed evenly throughout the entire region of the reactor 3 in plan view of the reactor 3.

In FIG. 1, the raw water flows out into the bottom part of the reactor 3 through the plurality of nozzles 5, but a permeable plate 12 such as perforated metal is disposed in the bottom part of the reactor 3, and a large-particle layer 13 such as rough gravel on the upper side of the permeable plate 12 and a small-particle layer 14 such as fine gravel on the upper side of the large-particle layer 13 may be formed, as shown in FIG. 2. The raw water flows out into a receiving chamber 15 on the lower side of the permeable plate 12 through the pipe 4 and nozzles 16, passing through the permeable plate 12, the large-particle layer 13, and the small-particle layer 14, to form the fluidized bed F of activated carbon within the reactor 3. The permeable plate such as perforated metal may be omitted.

Other examples of the form of circulating the oxygen-containing gas through the oxygen permeable membrane modules 2 will be described below with reference to FIGS. 3 to 5.

Figure 3:
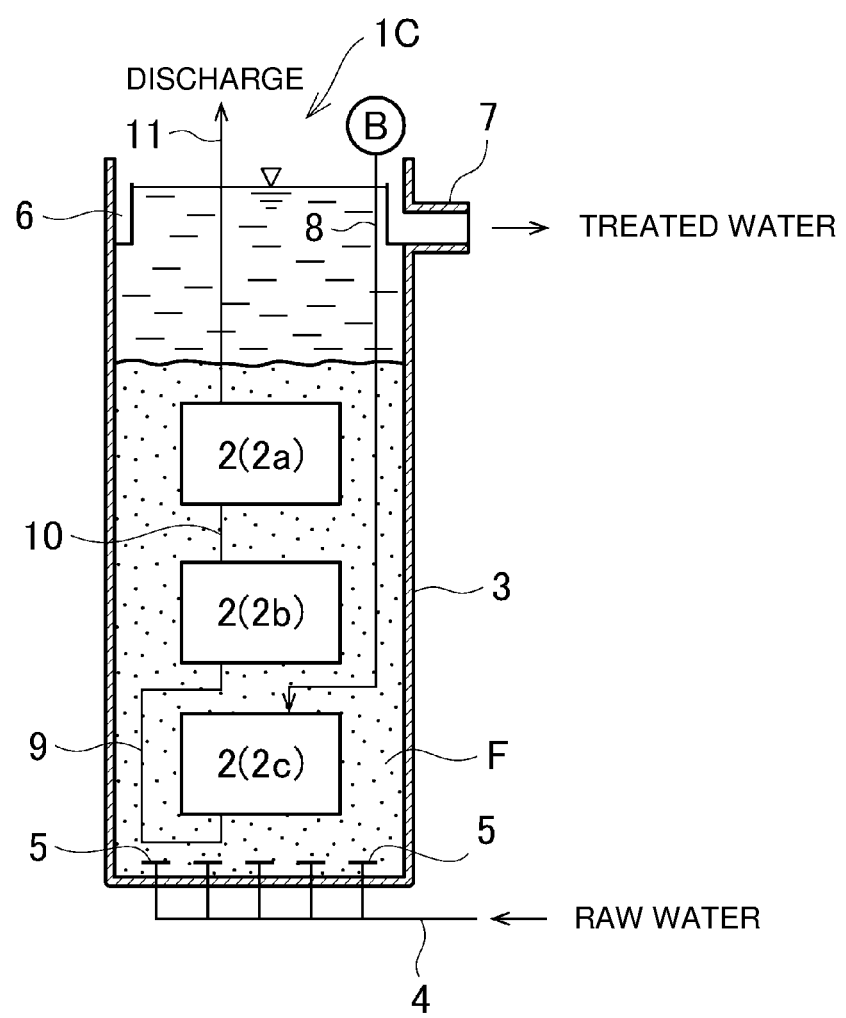
FIG. 3 is a vertical sectional view of a biological activated carbon treatment apparatus according to an embodiment.

In the biological treatment apparatus of FIG. 3, the oxygen-containing gas from the blower B is supplied to the top of the oxygen permeable membrane module 2*c* in the lowermost stage through the pipe 8, flows out of the bottom thereof, is supplied to the bottom of the oxygen permeable membrane module 2*b* in the second stage from the lowermost stage, flows out of the top thereof, is then supplied to the bottom of the oxygen permeable membrane module 2*a* in the uppermost stage, and is discharged from the top thereof via the pipe 11.

Figure 4:
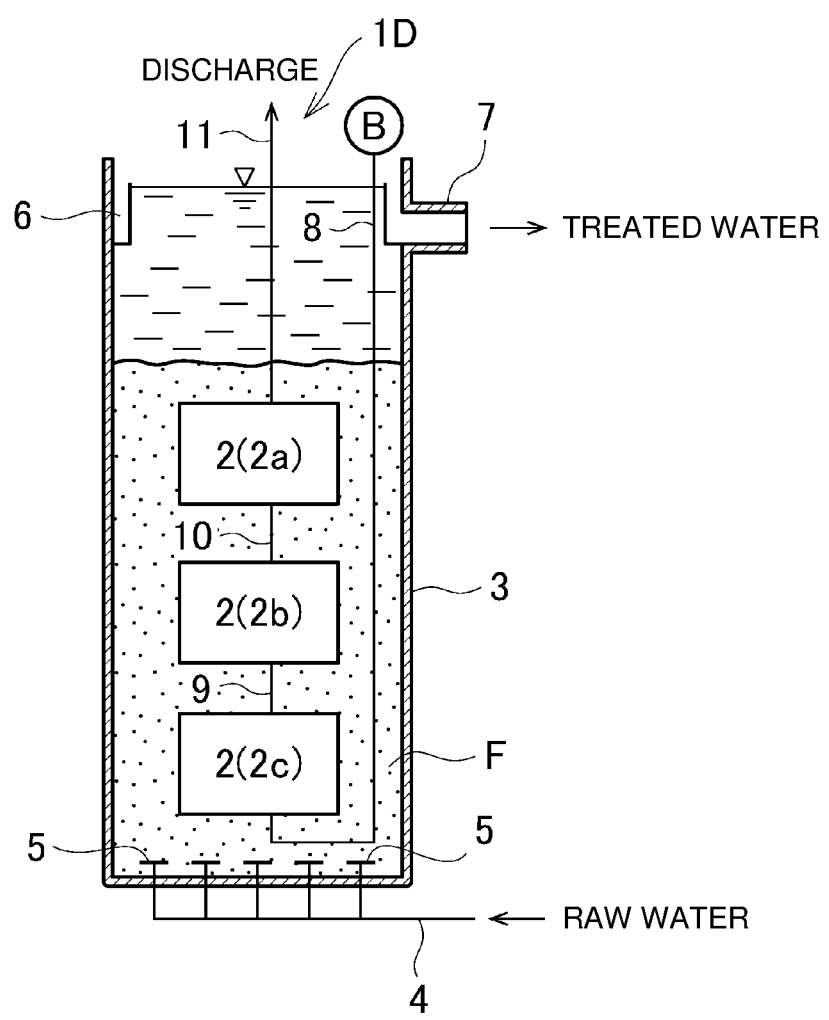
FIG. 4 is a vertical sectional view of a biological activated carbon treatment apparatus according to an embodiment.

In the biological treatment apparatus of FIG. 4, the oxygen-containing gas from the blower B is supplied to the bottom of the oxygen permeable membrane module 2*c* in the lowermost stage through the pipe 8, flows out of the top thereof, is supplied to the bottom of the oxygen permeable membrane module 2b in the second stage from the lowermost stage, flows out of the top thereof, is then supplied to the bottom of the oxygen permeable membrane module 2a in the uppermost stage, and is discharged from the top thereof via the pipe 11.

Figure 5:
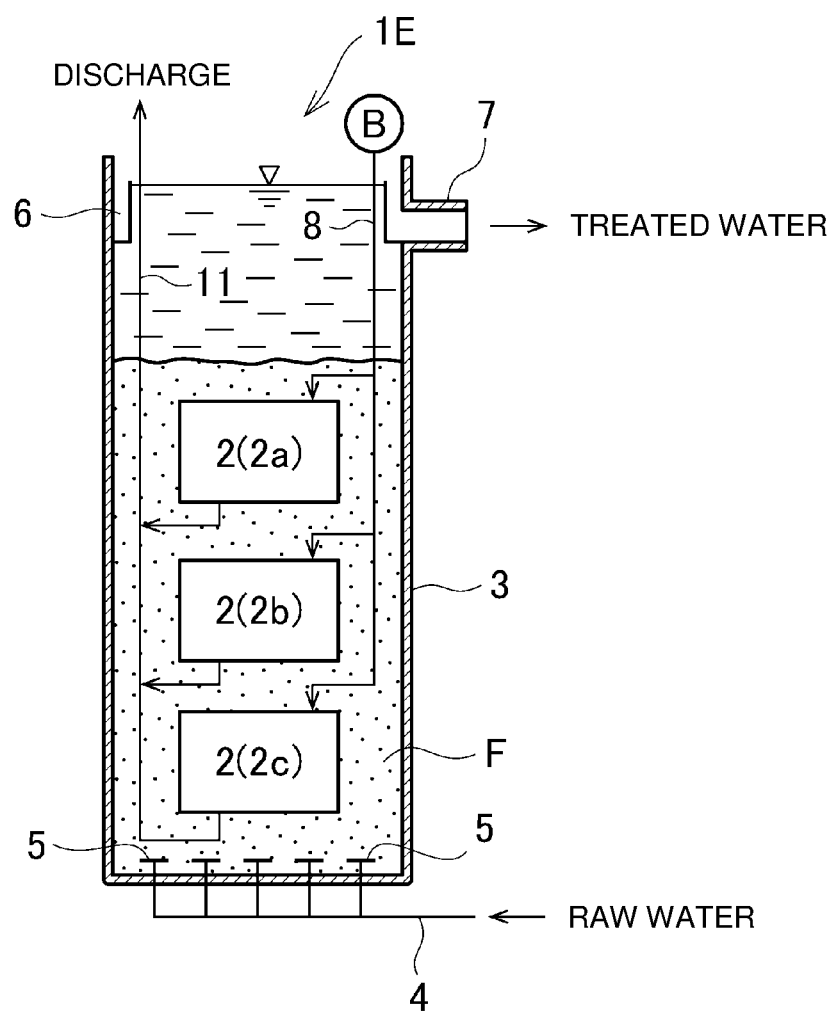
FIG. 5 is a vertical sectional view of a biological activated carbon treatment apparatus according to an embodiment.

In the biological treatment apparatus of FIG. 5, the oxygen-containing gas flows into each of the oxygen permeable membrane modules 2a to 2c in parallel. That is, the oxygen-containing gas from the blower B is supplied to the top of each of the oxygen permeable membrane modules 2a, 2b and 2c through the pipe 8, flows out of the bottom thereof, and is discharged via the pipe 11.

Condensed water within the oxygen permeable membrane module 2c easily escapes in the biological treatment apparatus configured so that the oxygen-containing gas is supplied to the top of the oxygen permeable membrane module 2c in the lowermost stage, flows out of the bottom of the oxygen permeable membrane module 2c, and thereafter sequentially flows toward the oxygen permeable membrane modules 2b and 2a on the upper side, as shown in FIGS. 1 to 3.

In the configuration in which the oxygen-containing gas flows upward within the oxygen permeable membrane modules 2a to 2c, as shown in FIG. 4, condensed water within the oxygen permeable membrane modules easily evaporates. In particular, the evaporation of the condensed water is facilitated by circulating a highly dry gas as the oxygen-containing gas.

Water to be treated flows upward within the reactor 3 in the biological treatment apparatus configured so that the oxygen-containing gas is circulated sequentially from the oxygen permeable membrane module 2c in the lowermost stage to the oxygen permeable membrane modules 2b and 2a on the upper stage side, as shown in FIGS. 1 to 4. Therefore, a larger amount of oxygen is supplied to water to be treated on the raw water side with a higher BOD concentration, and thus oxygen can be supplied in an amount corresponding to the load.

When the oxygen-containing gas is circulated through the oxygen permeable membrane modules 2a to 2c in parallel, as shown in FIG. 5, the pressure loss of the oxygen-containing gas is reduced, resulting in energy saving. In FIG. 5, oxygen can be supplied in an amount corresponding to the load by circulating a larger amount of the oxygen-containing gas in the oxygen permeable membrane module on the lower stage side.

In any one of FIGS. 1 to 5, the area or the filling density of the membrane may be set smaller in the oxygen permeable membrane module on the upper stage side.

Also in FIGS. 3 to 5, the bottom structure may have the permeable plate 12, the large-particle layer 13, and the small-particle layer 14, as shown in FIG. 2.

The oxygen permeable membranes in the oxygen permeable membrane modules 2 may be any of hollow fiber membranes, flat membranes, and spiral membranes, but hollow fiber membranes are preferable. As a material for membranes, silicone, polyethylene, polyimide, polyurethane, and the like which are generally used for MABRs can be used, but silicone is suitable. A high-strength composite membrane with porous hollow fibers coated with a non-porous polymer may be used.

Such a hollow fiber membrane preferably has an inner diameter of 0.05 to 4 mm, particularly 0.2 to 1 mm, and a thickness of 0.01 to 0.2 mm, particularly 0.02 to 0.1 mm. When the inner diameter is smaller than the above range, the aeration pressure loss is high. When the aeration pressure loss is high, the surface area decreases, and the oxygen dissolution rate decreases. When the thickness is smaller than the above range, the physical strength decreases, and the membrane easily breaks. Conversely, when the thickness is larger than the above range, the oxygen permeation resistance increases, and the oxygen dissolution efficiency decreases.

The length of the hollow fiber membrane is preferably about 0.5 to 3 m, particularly about 1 to 2 m. An excessively large length of the hollow fiber membrane causes problems such as a decrease in oxygen dissolution efficiency and an increase in pressure loss by a reduction in surface area due to breakage or agglomeration into a dumpling shape when a large amount of biofilms are attached to the hollow fiber membrane. An excessively small length of the hollow fiber membrane results in high cost. The length of a flat membrane or a spiral membrane is also preferably 0.5 to 1.5 m by the same reasons.

The necessary area of the membrane is a sufficient amount that enables the supply of a necessary amount of oxygen for treatment. For example, in the case of raw water with a CODcr of 50 mg/L and a residence time of 30 minutes, a silicone hollow fiber membrane having a thickness of 100 μm needs to be 240 $m^2$ or more per 1 $m^3$ of the volume of the fluidized activated carbon portion.

The area of the membrane is preferably 300 $m^2$ or more and 1000 $m^2/m^3$ or less per volume of the tank. When the membrane area is large, the amount of oxygen to be supplied increases to enable a high load, but the membrane cost increases. When the membrane area per unit volume is excessively large, the membrane is formed into a dumpling shape, and the efficiency decreases. The membrane is preferably provided in the flow direction. For example, in a tank with a water depth of 10 m, membranes with a length of 2 m are preferably provided vertically in 4 stages.

Next, an example of the structure of the oxygen permeable membrane module will be described with reference to FIGS. 6 to 11.

Figure 6:
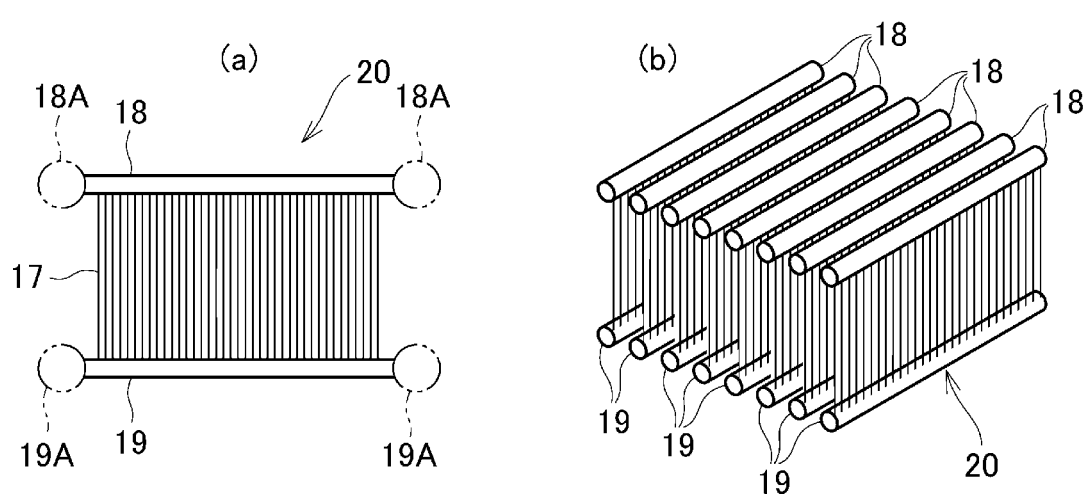
FIG. 6 includes a side view of an oxygen supply permeable membrane module and a perspective view of the oxygen supply permeable membrane module.

An oxygen permeable membrane module 20 in FIG. 6 uses hollow fiber membranes 17 as oxygen permeable membranes. In this embodiment, the hollow fiber membranes 17 are arrayed in the vertical direction, the upper end of each of the hollow fiber membranes 17 is connected to an upper header 18, and the lower end thereof is connected to a lower header 19. The inside of the hollow fiber membrane 17 communicates with the inside of the upper header 18 and the inside of the lower header 19. Each of the headers 18 and 19 is hollow tubular, and a plurality of headers 18 and 19 are arrayed in parallel substantially in the horizontal direction. Also in the case of using flat membranes or spiral membranes, the membranes are arrayed in the vertical direction.

It is preferable that one end or both ends of each header 18 be connected to manifolds 18A, and one end or both ends of each header 19 be connected to manifolds 19A. When the oxygen-containing gas is supplied to the top of the oxygen permeable membrane module 20 and is discharged from the bottom of the oxygen permeable membrane module 20, the oxygen-containing gas flows from the upper headers 18 to the lower headers 19, passing through the hollow fiber membranes 17, and, in the meantime, oxygen is dissolved in water within the reactor 3, permeating through the hollow fiber membranes 17. Conversely, when the oxygen-containing gas is supplied to the bottom of the oxygen permeable membrane module 20 and is discharged from the top thereof, the oxygen-containing gas is supplied to the lower headers 19 and is discharged from the upper headers 18, passing through the hollow fiber membranes 17.

Figure 7:
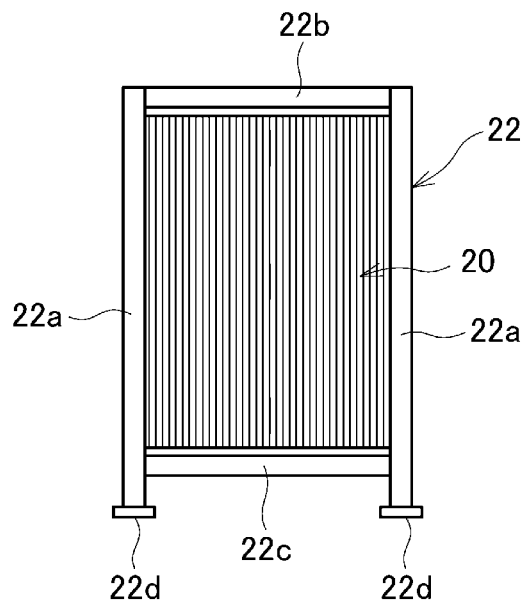
FIG. 7 is a front view of a hollow fiber membrane module.

FIG. 7 is a front view showing an example of the oxygen permeable membrane module 20 disposed within a frame 22. The frame 22 has four pillars 22a erected at four corners respectively, an upper beam 22b provided between the upper ends of each two pillars 22a, a lower beam 22c provided between lower parts of each two pillar 22b, and a bottom seat plate 22d attached to the lower end surface of each pillar 22a. The manifolds 13 and 14 of the oxygen permeable membrane module 20 are held by the frame 22, so that the oxygen permeable membrane module 20 is provided within the frame 22.

Oxygen permeable membrane modules 20 each including the frame 22 are easily provided vertically in multiple stages within the reactor 3. That is, one oxygen permeable membrane module 20 on the upper side can be disposed by placing the bottom seat plate 22d of the oxygen permeable membrane module 20 on the upper side on the frame 22 of another oxygen permeable membrane module 20 on the lower side.

In one aspect of the present invention, a membrane module with a small height of about 1 to 2 m is formed using a hollow fiber membrane module in which hollow fiber membranes are arrayed in the vertical direction, and such hollow fiber membrane modules are stacked in 2 stages or more, preferably 4 stages or more.

In this way, the length of each hollow fiber membrane is reduced, and hollow fiber membrane modules having a small height are stacked in multiple stages, thereby enabling oxygen to be dissolved with a low pressure.

The pressure of the oxygen-containing gas blown into the hollow fiber membranes is suitably a pressure that is slightly higher than the pressure loss of the hollow fiber membranes, for example, about 5 to 20% higher in view of the cost.

The pressure to be supplied to the hollow fiber membranes may be determined regardless of the water depth. As the water depth of the reactor increases, the present invention is more advantageous, because general aeration apparatuses require a pressure higher than the water depth.

Depending on the pipe connection between the modules in the vertical direction, the influence of condensed water within the membranes or carbon dioxide gas dissolved into the membranes from the biological tank differs. Therefore, the pipe connection structure is preferably formed, in consideration of the pressure loss, the condensed water, and the carbon dioxide gas.

Figure 8:
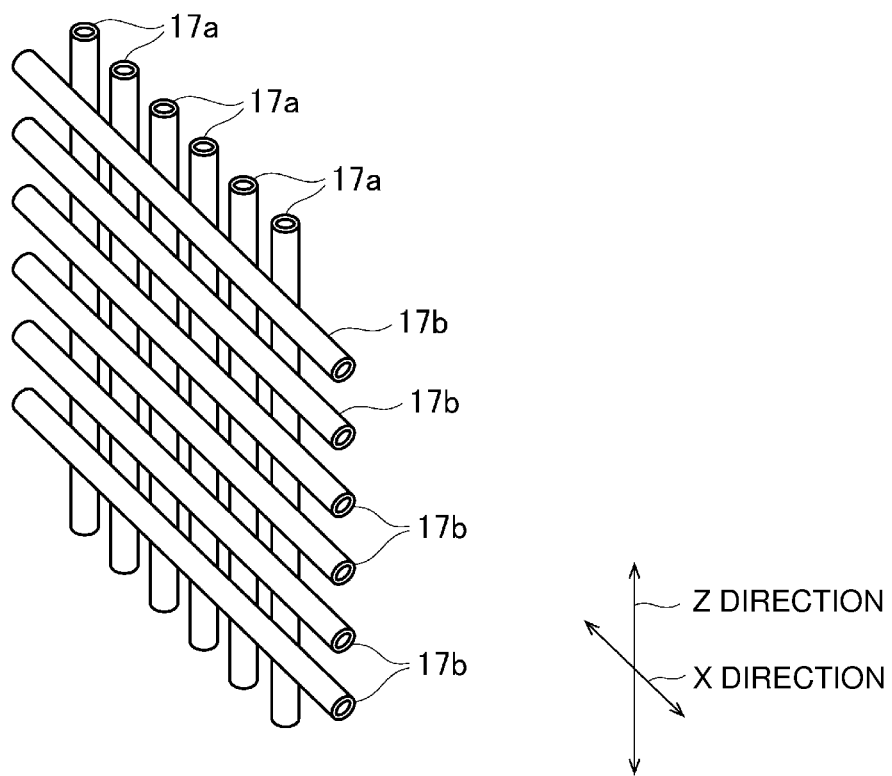
FIG. 8 is a perspective view illustrating an array of a hollow fiber membrane.
Figure 9:
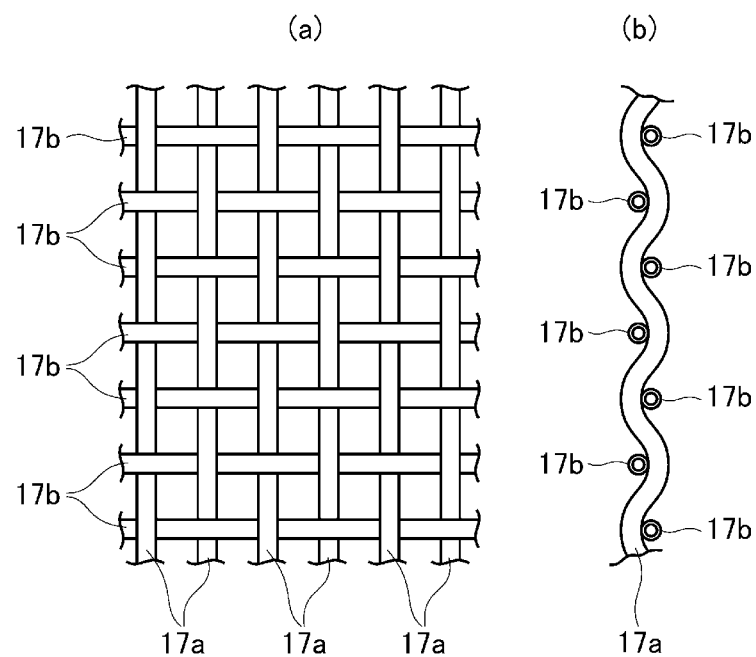
FIG. 9 includes a front view showing an array of a hollow fiber membrane in a hollow fiber membrane module and a side view thereof.

In the aforementioned embodiment, the hollow fiber membranes 17 are provided in the vertical direction, and the raw water (water to be treated) flows in the vertical direction along the hollow fiber membranes 17, as shown in FIGS. 6 and 7, but an oxygen permeable membrane module having hollow fiber membranes 17b in the horizontal X direction and hollow fiber membranes 17a in the vertical direction (Z direction), as shown in FIG. 8, may be used as at least part of the oxygen permeable membrane modules. As shown in FIG. 9, the hollow fiber membranes 17a and 17b may be braided into a plain weave shape.

Figure 10:
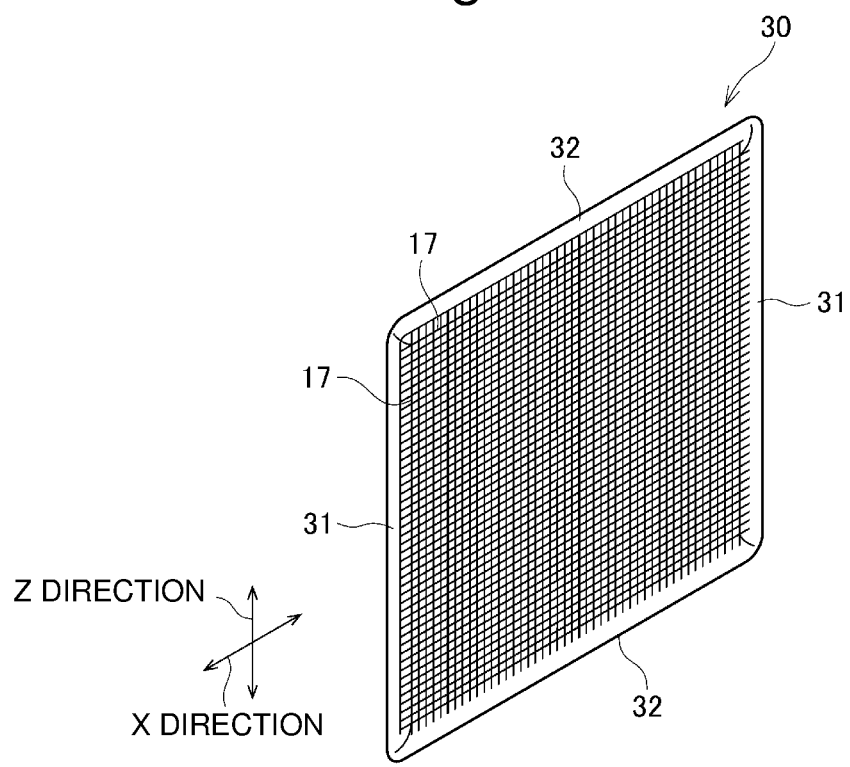
FIG. 10 is a perspective view of a hollow fiber membrane module.

FIG. 10 is a perspective view showing an example of an oxygen permeable membrane module including the hollow fiber membranes 17 (17a and 17b) in the X and Z directions. Such an oxygen permeable membrane module 30 has a pair of headers 31, 31 that are parallel to each other and extend in the Z direction, a pair of headers 32, 32 that are orthogonal to the headers 31 and extend in the X direction, and the hollow fiber membranes 17. The hollow fiber membranes 17 in the X direction are provided between the headers 31, 31, and the hollow fiber membranes 17 in the Z direction are provided between the headers 32, 32.

The ends of the headers 31, 32 are connected to each other, so that the headers 31, 32 form a rectangular frame. In one aspect of the oxygen permeable membrane module 30, closing members (not shown) such as end plugs are provided inside both ends of the headers 31, 32, so that the headers 31, 32 are blocked from each other. The oxygen-containing gas is supplied to one of the headers 31 and flows into the other of the headers 31 through the hollow fiber membranes 17. Further, the oxygen-containing gas is supplied to one of the headers 32 and flows into the other of the headers 32 through the hollow fiber membranes 17.

In another aspect of the oxygen permeable membrane module 30, one of the headers 31 and one of the headers 32 communicate with each other. Further, the other of the headers 31, 32 and the other of the headers 32, 32 communicate with each other. Closing members (not shown) such as end plugs are provided inside the connection parts of the first headers 31, 32 and the other headers 31 and 32, so that the first headers 31, 32 and the other headers 31, 32 are blocked from each other. The oxygen-containing gas is supplied to the first headers 31, 32 and flows into the other headers 31, 32 through the hollow fiber membranes 17.

In FIG. 6 to FIG. 10, these hollow fiber membranes are provided singly, but may be formed into bundles of several to about 100 membranes.

In the present invention, an aeration apparatus may be provided in a lower part of the reactor.

Next, suitable examples of the biological carrier, the oxygen-containing gas, and other treatment conditions used in the present invention will be described.

<Biological Carrier>

The biological carrier is suitably activated carbon.

The filling ratio of the activated carbon is preferably about 40 to 60%, particularly about 50%, of the volume of the reactor. As the filling ratio increases, the biomass and the activity also increase, but when it is excessively large, there is a risk of outflow. Accordingly, water is preferably passed at a LV at which activated carbon phase expands by about 20 to 50% with a filling ratio of about 50%. The water flow LV is about 7 to 15 m/hr in a 0.5-mm activated carbon. Materials other than activated carbon such as gelatinous materials, porous materials, and non-porous materials can also be used under the same conditions. For example, polyvinyl alcohol gel, polyacrylamide gel, polyurethane foam, calcium alginate gel, zeolite, plastic, and the like can also be used. However, use of activated carbon as a carrier enables removal of a wide range of pollutants by the interaction due to the adsorption action and the biodegradation action of activated carbon.

The average particle size of the activated carbon is preferably about 0.2 to 3 mm. A large average particle size enables a high LV and increases the circulating volume, thereby enabling high load. However, the surface area decreases, and therefore the biomass decreases. A small average particle size enables fluidization with low LV, and therefore the pump power is inexpensive. Further, since the surface area is large, the biomass to be attached increases.

An optimal particle size is determined, depending on the concentration of waste water. In the case of TOC: 50 mg/L, it is preferably about 0.2 to 0.4 mm. In the case of TOC: 10 mg/L, it is preferably about 0.6 to 1.2 mm.

The deployment rate of activated carbon is preferably about 20 to 50%. When the deployment rate is lower than 20%, there is a risk of clogging or short circuit. When the deployment rate is higher than 50%, there is a risk of outflow, and the cost of pump power increases.

In general biological activated carbon, the expansion coefficient of the fluidized bed of activated carbon is about 10 to 20%. In this case, the flow state of activated carbon is not uniform, and activated carbon flows vertically and horizontally. As a result, the membranes that have been simultaneously provided are rubbed by the activated carbon and are worn out to be depleted. In order to prevent this, activated carbon needs to be sufficiently fluidized, and the expansion coefficient is desirably 20% or more, in the present invention. Therefore, the particle size of activated carbon is preferably smaller than that of general biological activated carbon. The activated carbon may be any of coconut charcoal, coal, charcoal, and the like. A spherical coal shape is preferable, but general granular coal or crushed coal may be employed.

<Oxygen-Containing Gas>

The oxygen-containing gas needs only to be a gas containing oxygen such as air, oxygen enriched air, and pure oxygen. The gas for aeration is desirably passed through a filter to remove fine particles.

The aeration volume is desirably about twice the equivalent amount of oxygen necessary for biological reaction. When the volume is smaller than this, BOD and ammonia remain in the treated water due to the lack of oxygen. When it is larger, the pressure loss increases in addition to an unnecessary increase in the aeration volume, thereby impairing the economic efficiency.

The aeration pressure is desirably slightly higher than the pressure loss of the hollow fibers generated at a predetermined aeration volume.

<Flow Rate of Water to be Treated>

The flow rate of the water to be treated is set to a LV of 10 m/hr or more, and the treated water is preferably treated with one pass without circulation.

As the LV is increased, the oxygen dissolution rate is improved in proportion thereto. With a LV of 50 m/hr, oxygen is dissolved about twice 10 m/hr. When the LV is high, activated carbon with a large particle size is preferably used, so as not to increase the deployment rate very much. In view of the biomass and the oxygen dissolution rate, the optimal LV range is about 10 to 30 m/hr.

<Residence Time>

The residence time is preferably set so that the tank load is 1 to 2 kg·TOC/$m^3$/day.

<Blower>

The blower with an outlet wind pressure that is equal to or lower than the water pressure derived from the water depth is sufficient. However, the outlet wind pressure needs to be equal to or higher than the pressure loss of the pipes and the like. Generally, the pipe resistance is about 1 to 2 kPa.

When the water depth is 5 m, general-purpose blowers with an output up to about 0.55 MPa are generally used, and when the water depth is larger than above, high-pressure blowers are used.

In the present invention, even when the water depth is 5 m or more, general-purpose blowers with a pressure of 0.5 MPa or less can be used, and low-pressure blowers of 0.1 MPa or less are preferably used.

The conditions of the supply pressure of the oxygen-containing gas are to be higher than the pressure loss of the hollow fiber membranes and lower than the pressure of the water depth, and further to be such that the membranes do not crushed by the water pressure. Since the pressure loss of flat membranes and spiral membranes is negligible as compared with the water pressure, the supply pressure is an exceptionally low pressure, for example, of about 5 kPa or higher and the water pressure or lower, desirably 20 kPa or lower.

In the case of hollow fiber membranes, the pressure loss varies depending on the inner diameter and the length. The amount of air for aeration is 20 mL to 100 mL/day per 1 $m^2$ of each membrane. Therefore, when the length of the membrane is doubled, the amount of air is also doubled, and even if the diameter of the membrane is doubled, the amount of air is only doubled. Accordingly, the pressure loss of the membrane is positively proportional to the length of the membrane and is inversely proportional to the diameter thereof.

The value of the pressure loss is about 3 to 20 kPa in the case of hollow fibers with an inner diameter of 50 μm and a length of 2 m.

According to the experiments by the inventors, it was recognized that the oxygen dissolution rate hardly changed as a result of changing the aeration pressure from 11 to 140 kPa and the aeration volume from 240 to 460 mL/min.

In the present invention, it is preferable that the oxygen dissolution efficiency be 30 to 100%, particularly 40 to 60%.

Although the present invention has been described in detail using specific aspects, it will be apparent to those skilled in the art that various modifications are possible without departing from the spirit and scope of the invention.

The present application is based on JP 2016-234233 A filed on Dec. 1, 2016, which is incorporated by reference in its entirety.

REFERENCE SIGNS LIST 1A to 1E: Biological treatment apparatus
2, 20, and 30: Oxygen permeable membrane module
17, 17a, and 17b: Hollow fiber membrane
18, 19, 31, and 32: Header
22: Frame

The invention claimed is:

1. A biological treatment apparatus for organic waste water in which a fluidized bed of a biological carrier is internally formed, comprising:
   a reactor;
   a raw water supply device that supplies raw water to a lower part of the reactor;
   an oxygen permeable membrane module provided inside the reactor;
   an oxygen-containing gas supply device that supplies an oxygen-containing gas to the oxygen permeable membrane module;
   a treated water extraction device that extracts treated water from an upper part of the reactor; and
   a first pipe extending from the module to outside;
   wherein the oxygen permeable membrane module comprises a plurality of non-porous oxygen permeable hollow fiber membranes arranged vertically;
   wherein the oxygen permeable membrane module comprises a plurality of oxygen permeable membrane modules separated from each other and arranged vertically inside the reactor;
   the oxygen-containing gas supply device further comprises a second pipe attached to a lower module in the oxygen permeable membrane modules arranged vertically, a third pipe extending from the lower module to another module located above the lower module; and
   the first pipe extends from the another module.

2. The biological treatment apparatus according to claim 1, wherein the oxygen-containing gas supply device comprises a blower, and a pressure of the blower is smaller than a water pressure generated at a water depth of the reactor.

3. The biological treatment apparatus according to claim 1, wherein the biological carrier is activated carbon.

4. The biological treatment apparatus according to claim 1, wherein the second pipe is attached to an upper portion of the lower module, the third pipe extends from a lower portion of the lower module to an upper portion of the another module, and the first pipe extends from a lower portion of the another module to outside.

5. The biological treatment apparatus according to claim 1, wherein the second pipe is attached to an upper portion of the lower module, the third pipe extends from a lower portion of the lower module to a lower portion of the another module, and the first pipe extends from an upper portion of the another module to outside.

6. The biological treatment apparatus according to claim 1, wherein the second pipe is attached to a lower portion of the lower module, the third pipe extends from an upper portion of the lower module to a lower portion of the another module, and the first pipe extends from an upper portion of the another module to outside.

7. The biological treatment apparatus according to claim 1, wherein the reactor includes a permeable plate in a bottom of the reactor, a particle layer disposed on the permeable plate, and another particle layer disposed on the particle layer and having particles smaller than those of the particle layer.

8. The biological treatment apparatus according to claim 1, wherein at least one of the plurality of oxygen permeable membrane modules includes hollow fiber membranes extending perpendicular to each other.

9. The biological treatment apparatus according to claim 8, wherein the hollow fiber membranes extending perpendicularly are braided into a plain weaving shape.

10. The biological treatment apparatus according to claim 1, wherein the plurality of oxygen permeable membrane modules is arranged such that an area or filling density of the membrane in an upper module in the oxygen permeable membrane modules arranged vertically is set smaller, respectively.

* * * * *